(12) United States Patent
Auger et al.

(10) Patent No.: US 7,510,651 B1
(45) Date of Patent: Mar. 31, 2009

(54) MULTI-FUNCTIONAL POOL FLOATING DEVICE

(76) Inventors: Joseph Jacques Charles Jean Auger, 3606 Southridge Dr., Castlegar, BC (CA) V1N 4A3; Joann Mary Auger, 3606 Southridge Dr., Castlegar, BC (CA) V1N 4A3

( * ) Notice: Subject to any disclaimer, the term of this patent is extended or adjusted under 35 U.S.C. 154(b) by 85 days.

(21) Appl. No.: 11/594,643

(22) Filed: Nov. 7, 2006

(51) Int. Cl.
*B01D 11/02* (2006.01)
*C02F 1/76* (2006.01)

(52) U.S. Cl. ............................... 210/167.11; 210/242.1; 422/265; 422/277

(58) Field of Classification Search ............ 210/167.11, 210/198.1, 232, 242.1; 422/265, 277; 4/496
See application file for complete search history.

(56) References Cited

U.S. PATENT DOCUMENTS

| | | | |
|---|---|---|---|
| 3,596,812 A | 8/1971 | Pandajis et al. | |
| 3,676,885 A * | 7/1972 | Wulc | 15/1.7 |
| D256,498 S | 8/1980 | Kennedy | |
| D275,311 S | 8/1984 | Wolfe | |
| 4,798,707 A * | 1/1989 | Thomas et al. | 422/264 |
| D309,493 S | 7/1990 | Casberg | |
| 4,964,185 A | 10/1990 | Lehn | |
| 5,053,205 A * | 10/1991 | Taylor et al. | 422/265 |
| 5,128,031 A * | 7/1992 | Midkiff | 210/109 |
| 6,221,244 B1 * | 4/2001 | Yassin | 210/167.11 |
| 6,238,553 B1 * | 5/2001 | Lin | 210/94 |
| 6,641,787 B1 | 11/2003 | Siggins et al. | |
| 2004/0144699 A1 * | 7/2004 | Lin | 210/85 |
| 2005/0279677 A1 * | 12/2005 | Lin | 210/96.1 |
| 2007/0034249 A1 * | 2/2007 | Romano et al. | 136/244 |

* cited by examiner

Primary Examiner—Fred Prince

(57) ABSTRACT

A multi-function chlorine dispenser performs several functions at once. The functions include dispensing chlorine, lighting up the pool at night and displaying water temperature. A further function of displaying time can also be included.

1 Claim, 1 Drawing Sheet

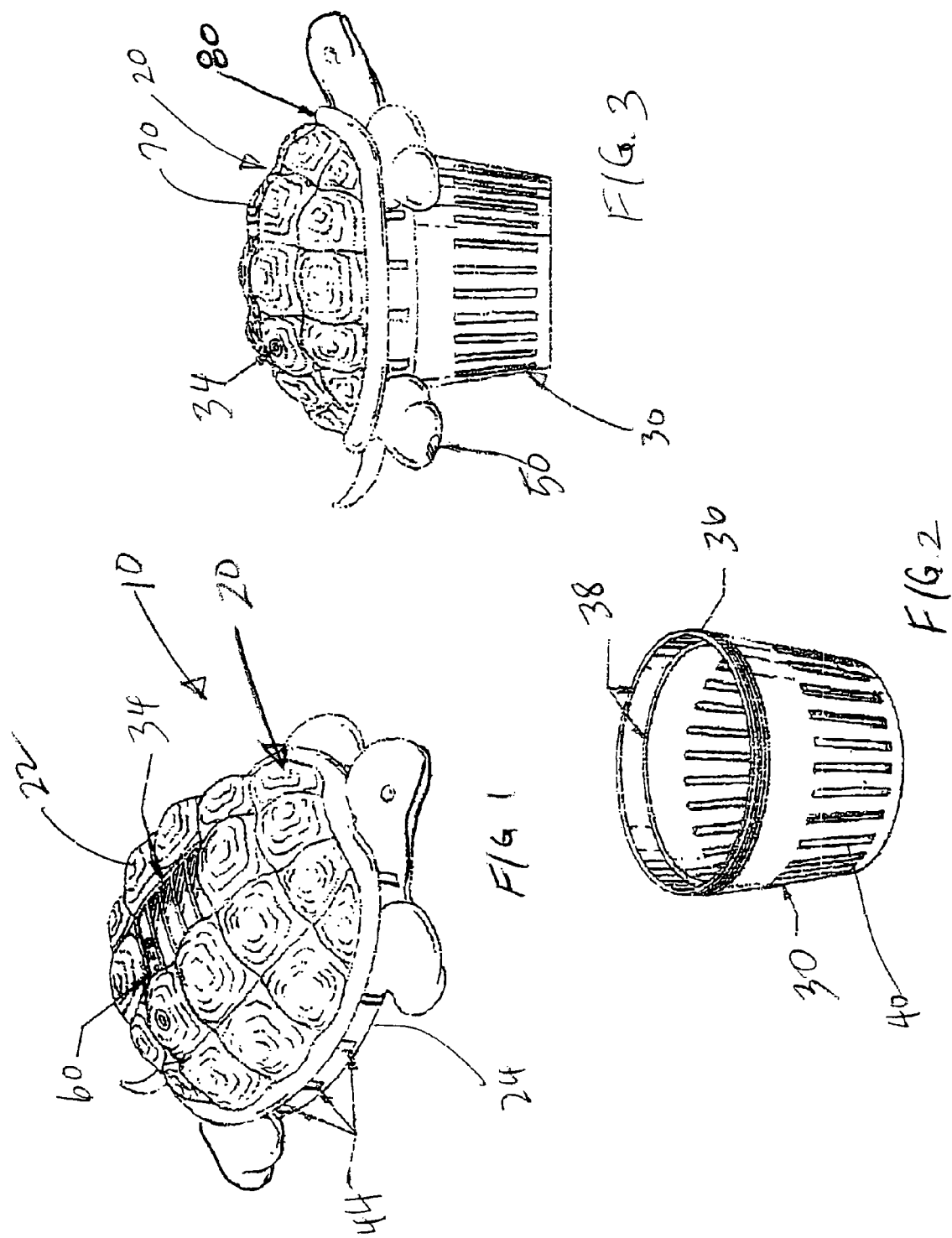

MULTI-FUNCTIONAL POOL FLOATING DEVICE

TECHNICAL FIELD OF THE INVENTION

The present invention relates to the general art of dissolvable solid chemicals dispensers, and to the particular field of liquid dispensers used in pool care.

BACKGROUND OF THE INVENTION

For reasons of health, any swimming pool of considerable size is usually provided with apparatus for chlorinating the water in the pool. When applied in proper quantities, the chlorine kills objectionable bacteria, and will not be harmful to those swimming in the pool. If the ratio of the chlorine to the water in the pool is too low, the pollution count may rise to objectionable levels; and on the other hand, if the ratio of the chlorine to the water is too high, it may have an adverse effect upon the health of the swimmers.

Heretofore a number of different devices have been developed for supplying chlorine to swimming pools to replenish, for example, the chlorine lost by evaporation or drainage, in order to maintain a relatively safe ratio of chlorine to water for swimming purposes. Such prior devices, however, have not been entirely satisfactory. For example, some of them, although designed to operate automatically, have been extremely complicated, expensive, and difficult to repair; while the less expensive have been unreliable, or have required periodic manual regulation for satisfactory results. Moreover, most such prior devices are specifically designed for chlorinating pools of a given size, and are not readily adaptable to chlorinating differently sized pools.

Chemical dispensers known to the inventor are used to dispense chlorine or bromine into the water of pools, spas and hot tubs. These dispensers typically float on the surface of the water or sit on the bottom of the pool, spa or hot tub to dispense chemicals from solid tablets. However, these dispensers usually are single function items and do not perform a plurality of functions.

Therefore, there is a need for a chlorine dispenser for a swimming pool or spa that can perform a plurality of functions.

SUMMARY OF THE INVENTION

The above-discussed disadvantages of the prior art are overcome by a multi-function chlorine dispenser that performs several functions at once. The functions include dispensing chlorine, lighting up the pool at night and displaying water temperature. A further function of displaying time can also be included. The device can be powered by solar energy if desired.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a perspective view of a multi-function pool accessory embodying the present invention.

FIG. 2 is a chlorine dispenser used in conjunction with the accessory shown in FIG. 1.

FIG. 3 is a side elevational view of the pool accessory of the present invention.

DETAILED DESCRIPTION OF THE INVENTION

Referring to the figures, it can be understood that the present invention is embodied in a pool accessory 10 that can be in the form of an attractive element, such as a turtle, or the like. Accessory 10 simultaneously performs a plurality of functions. Accessory 10 comprises a floatation body 20 which has a first surface 22 that is a top surface when the body is in use, a second surface 24 that is a bottom surface when the body is in use and a side surface 26 which connects the first and second surfaces together.

A chlorine dispenser element 30 is mounted on the second surface of the floatation body and an array 34 of solar collectors is located on the first surface. The first surface may be a top surface of the chlorine dispenser element 30 to collect sun light during the day. Chlorine dispenser unit is threadably mounted on the floatation body by threads 36 and can include multi-layers 38 which cover or expose holes 40 as required to control the dispensing of chlorine. The solar collectors are part of a circuit that converts solar energy into power. The details of such a circuit are well known to those skilled in the art and are not important to this invention. As such, these details will not be presented or claimed.

A plurality of lights 44, such as LEDs or the like, are located in the side surface and are connected to the solar collectors to be powered thereby. A water temperature sensor 50 is mounted on the floatation body and is connected to the solar collectors to be powered thereby. A digital display 60 is mounted on the floatation body and is connected to the solar collectors to be powered thereby. Display 60 is also connected to the water temperature sensor.

A digital clock 70 can also be mounted on the floatation body and will be connected to the solar collectors for power. Using accessory 10, a plurality of functions, including chlorine dispensing, will be simultaneously performed. Further lighting 80 can be included if desired, with the further lighting also being powered by the solar collectors.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A pool floating device consisting of:
   A) a floatation body having
      (1) a first surface that is a top surface when the body is in use, the top surface having a shape of an animal,
      (2) a second surface that is a bottom surface when the body is in use, and
      (3) a side surface which connects the first and second surfaces together;
   B) a chlorine dispenser element mounted on the second surface of the floatation body;
   C) an array of solar collectors on the first surface;
   D) a plurality of lights in the side surface, the lights being connected to the solar-collectors to be powered thereby;
   E) a water temperature sensor mounted on the floatation body and connected to the solar collectors to be powered thereby; and
   F) digital display mounted on the floatation body and connected to the solar collectors to be powered thereby and connected to the water temperature sensor.

* * * * *